(12) United States Patent
Irwin

(10) Patent No.: US 9,970,517 B2
(45) Date of Patent: May 15, 2018

(54) SATELLITE BOOM HINGE ACTUATOR USING DRIVE CHAIN WITH FLEXIBLE AND RIGID CHARACTERISTICS

(71) Applicant: NORTHROP GRUMMAN SYSTEMS CORPORATION, Falls Church, VA (US)

(72) Inventor: Brendan J. D. Irwin, Ventura, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 281 days.

(21) Appl. No.: 14/811,747

(22) Filed: Jul. 28, 2015

(65) Prior Publication Data

US 2017/0030441 A1    Feb. 2, 2017

(51) Int. Cl.
*B64G 1/22* (2006.01)
*F16H 21/44* (2006.01)
(Continued)

(52) U.S. Cl.
CPC ............. *F16H 21/44* (2013.01); *B64G 1/222* (2013.01); *E05D 3/04* (2013.01); *E05D 5/04* (2013.01); *E05F 15/619* (2015.01); *E05F 15/627* (2015.01); *F16G 13/20* (2013.01); *E05Y 2201/724* (2013.01); *E05Y 2600/41* (2013.01); *E05Y 2900/502* (2013.01)

(58) Field of Classification Search
CPC .. B64G 1/222; B64G 1/22; B64G 1/44; B66F 13/005; F16G 13/20; F16C 11/10; F16D 1/12; E05D 11/10; E05D 3/02; E05D 3/06; E05F 11/24; E05F 11/00
See application file for complete search history.

(56) References Cited

U.S. PATENT DOCUMENTS

| | | | | |
|---|---|---|---|---|
| 2,045,261 A | * | 6/1936 | Clute | E05D 13/06 254/95 |
| 2,131,261 A | * | 9/1938 | Aldeen | F16G 13/02 254/95 |

(Continued)

OTHER PUBLICATIONS (PCT/US2016/032768) International Searching Authority, International Search Report, dated Aug. 11, 2016.*

*Primary Examiner* — Troy Chambers
*Assistant Examiner* — Michael A. Fabula
(74) *Attorney, Agent, or Firm* — John A. Miller; Shumaker, Loop & Kendrick, LLP

(57) ABSTRACT

A flex-drive actuator for a satellite boom hinge or other hinge applications. Using a motor-driven cog and a unique drive chain, the hinge can be reversibly driven between open and closed positions, thereby deploying or stowing the boom and attached payload. The chain includes links designed so that, when bent in one direction, the chain pre-buckles into a rigid circular arc form that matches the deployment path of the hinge. This pre-buckling essentially converts the chain into a rigid gear segment that can carry a moment to actuate the hinge. As the cog retracts the chain and the hinge closes, the circular shape of the chain de-buckles on the free side of the cog, where the chain can be stored as a straight section inside of a boom tube or folded into a magazine. The flex-drive actuator can accommodate any desired actuation angle by addition of links to the chain.

19 Claims, 7 Drawing Sheets

(51) Int. Cl.
*F16G 13/20* (2006.01)
*E05F 15/627* (2015.01)
*E05D 3/04* (2006.01)
*E05D 5/04* (2006.01)
*E05F 15/619* (2015.01)

(56) References Cited

U.S. PATENT DOCUMENTS

| | | | | |
|---|---|---|---|---|
| 2,832,590 A * | 4/1958 | Youngberg | ............. | E05F 11/06 49/325 |
| 3,090,613 A * | 5/1963 | Bechtold | ............. | E04D 13/0352 49/325 |
| 3,610,058 A | 10/1971 | Mueller et al. | | |
| 3,645,146 A | 2/1972 | Nagin | | |
| 3,911,802 A * | 10/1975 | Morden | ................. | B60H 1/262 296/223 |
| 4,014,136 A * | 3/1977 | Hemens | ................. | E05F 11/06 49/325 |
| 4,116,258 A | 9/1978 | Slysh et al. | | |
| 4,342,367 A * | 8/1982 | Gates | ................. | A01B 73/04 172/311 |
| 4,382,349 A * | 5/1983 | Dunphy | ................. | E05F 11/06 49/325 |
| 4,393,541 A | 7/1983 | Hujsak et al. | | |
| 4,441,376 A * | 4/1984 | Tobey | ................. | B64G 1/222 16/223 |
| 4,480,415 A | 11/1984 | Truss | | |
| 4,481,735 A * | 11/1984 | Jentoft | ................. | E05F 11/06 49/139 |
| 4,521,993 A * | 6/1985 | Tacheny | ................. | E05F 11/06 49/325 |
| 4,532,674 A * | 8/1985 | Tobey | ................. | B64G 9/00 16/295 |
| 4,558,967 A | 12/1985 | Craighead, II et al. | | |
| 4,561,614 A * | 12/1985 | Olikara | ................. | B64G 1/222 136/245 |
| 4,615,637 A * | 10/1986 | Pelischek | ................. | B64G 1/222 16/294 |
| 4,941,316 A * | 7/1990 | Bechtold | ................. | B21L 9/065 292/264 |
| 4,945,678 A * | 8/1990 | Berner | ................. | E05F 11/505 192/150 |
| 5,037,043 A * | 8/1991 | Roth | ................. | B64G 1/222 136/245 |
| 5,086,541 A * | 2/1992 | Auternaud | ........... | B25J 17/0241 16/227 |
| RE34,287 E * | 6/1993 | Berner | ................. | E05F 15/619 192/150 |
| 5,271,182 A * | 12/1993 | Greisner | ................. | B66F 3/06 49/325 |
| 5,509,747 A * | 4/1996 | Kiendl | ................. | B64G 1/222 136/245 |
| 5,667,325 A * | 9/1997 | Millard | ................. | B64G 1/22 182/41 |
| 5,716,030 A * | 2/1998 | LaFiandra | ................. | B64G 1/66 244/129.4 |
| 5,802,768 A * | 9/1998 | Hammer | ................. | E05F 15/619 403/345 |
| 5,826,832 A * | 10/1998 | Stich | ................. | B64G 1/222 244/172.6 |
| 5,833,176 A * | 11/1998 | Rubin | ................. | B64G 1/443 136/245 |
| 5,896,702 A * | 4/1999 | Wæhrens | ................. | E05F 11/06 49/325 |
| 5,909,860 A * | 6/1999 | Lee | ................. | B64G 1/222 136/245 |
| 6,010,096 A * | 1/2000 | Baghdasarian | ................. | B64G 1/222 160/135 |
| 6,092,337 A * | 7/2000 | Johnson | ................. | E05F 15/619 296/146.8 |
| 6,158,088 A * | 12/2000 | Bulboaca | ................. | B64G 1/222 16/291 |
| 6,224,037 B1 | 5/2001 | Novick | | |
| 6,405,486 B1 * | 6/2002 | Rogers, Jr. | ............. | E05F 15/619 296/146.1 |
| 6,488,435 B1 * | 12/2002 | Janson | ................. | B64G 1/222 136/245 |
| 6,505,381 B1 * | 1/2003 | Thomson | ................. | B64G 1/222 16/282 |
| 6,682,020 B2 | 1/2004 | Janson | | |
| 7,905,156 B2 * | 3/2011 | Scott | ................. | B66D 1/54 74/89.21 |
| 7,942,185 B2 * | 5/2011 | Long | ................. | E05F 15/605 160/188 |
| 8,468,747 B2 * | 6/2013 | Mingardi | ................. | E05F 11/06 49/325 |
| 8,496,209 B2 * | 7/2013 | Chaix | ................. | B64G 1/222 244/172.6 |
| 8,635,928 B2 * | 1/2014 | Graham | ................. | B25J 9/06 74/490.04 |
| 8,876,062 B1 * | 11/2014 | Baghdasarian | ........ | B64G 1/222 16/231 |
| 8,915,474 B1 * | 12/2014 | Baghdasarian | ........ | B64G 1/222 244/172.6 |
| 8,967,005 B2 * | 3/2015 | Saji | ................. | B66F 3/06 474/150 |
| 8,992,108 B2 * | 3/2015 | Baudasse | ................. | B64G 1/222 16/227 |
| 9,541,161 B2 * | 1/2017 | Kaisaku | ................. | F16G 13/20 |
| 2005/0178921 A1 * | 8/2005 | Stribling | ................. | B64G 1/222 244/172.7 |
| 2007/0094847 A1 * | 5/2007 | Thomson | ................. | B64G 1/222 16/369 |
| 2007/0146227 A1 * | 6/2007 | Brooks | ................. | B64G 1/222 343/881 |
| 2007/0169414 A1 * | 7/2007 | Soerensen | ................. | E05F 11/06 49/325 |
| 2008/0040978 A1 * | 2/2008 | Diekmann | ............. | E05F 15/619 49/252 |
| 2009/0008615 A1 | 1/2009 | Young et al. | | |
| 2009/0124444 A1 * | 5/2009 | Soerensen | ................. | F16G 13/20 474/206 |
| 2009/0282646 A1 * | 11/2009 | Baudasse | ................. | B64G 1/222 16/273 |
| 2010/0325964 A1 * | 12/2010 | Berkley | ................. | E05F 11/06 49/358 |
| 2011/0097138 A1 * | 4/2011 | Eikelenboom | ......... | B64G 1/222 403/81 |
| 2011/0147532 A1 * | 6/2011 | Chaix | ................. | B64G 1/222 244/172.6 |
| 2011/0302843 A1 * | 12/2011 | Dallmann | ................. | E05F 11/06 49/358 |
| 2012/0095596 A1 | 4/2012 | Cole et al. | | |
| 2012/0137801 A1 * | 6/2012 | Baudasse | ................. | B64G 1/222 74/89.14 |
| 2012/0167344 A1 * | 7/2012 | Valembois | ................. | F16F 15/30 16/321 |
| 2012/0321372 A1 * | 12/2012 | Baudasse | ................. | B64G 1/222 403/53 |
| 2012/0325973 A1 * | 12/2012 | Vezain | ................. | B64G 1/66 244/172.6 |
| 2014/0263847 A1 * | 9/2014 | Eskenazi | ................. | B64G 1/222 244/172.6 |
| 2016/0201372 A1 * | 7/2016 | Baghdasarian | ..... | E05D 11/1014 244/172.6 |
| 2016/0218408 A1 * | 7/2016 | Saito | ................. | H01P 1/042 |
| 2016/0264264 A1 * | 9/2016 | Helmer | ................. | B64G 1/222 |
| 2016/0297551 A1 * | 10/2016 | Cael | ................. | B64G 1/503 |

\* cited by examiner

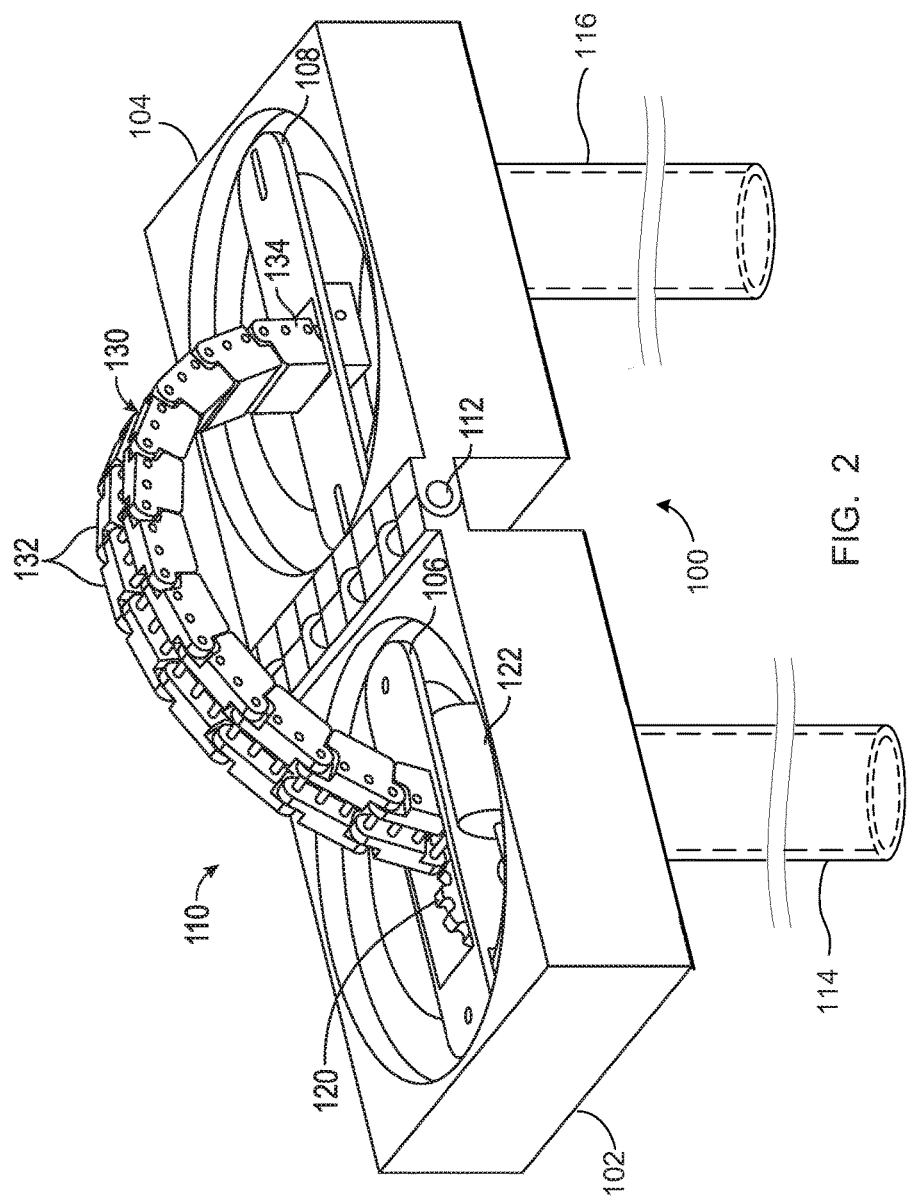

SATELLITE BOOM HINGE ACTUATOR USING DRIVE CHAIN WITH FLEXIBLE AND RIGID CHARACTERISTICS

BACKGROUND

Field

This invention relates generally to a drive chain which forms a rigid circular arc and, more particularly, to a drive chain designed to be used as an actuator for a hinge, where the chain includes links with offset pivot pins and abutment surfaces which cause the chain to form a rigid circular arc concentric with the rotational axis of the hinge, such that the chain can be used to drive the hinge in either direction.

Discussion

Spacecraft often employ various types of structures, such as reflectors, antenna arrays, sensors, etc., that must be deployed away from the spacecraft on a boom when the spacecraft is on orbit or in space. These booms typically employ one or more hinges that allow the boom and the structure to be folded or stowed into the spacecraft envelope or fairing during launch, and then be unfolded in space to the deployed position. In certain designs for larger structures, such as antenna reflectors, the boom and hinges are very robust to provide the desired pointing stiffness so that the structure remains pointed in the proper direction for a particular mission requirement. Various techniques are known in the art for unfolding or deploying the boom, including the use of motors, preloaded springs and other types of actuators.

A certain class of boom hinges are "clam-shell" designs that include two hinge halves. These boom hinges typically autonomously rotate from the stowed position when the antenna is in the spacecraft for launch to the deployed position when the spacecraft is in space. One known type of actuator for such boom hinges includes a linkage, such as a four-bar linkage, to reversibly open or close the hinge.

Hinge actuator designs for the boom hinge described above may be problematic in that if the boom hinge has a large rotation angle, for example 180°, from the stowed position to the deployed position, the links have to be so long that they need to pass through slots provided in the boom and hinge body wall when they are rotated through the deployment sequence. These slots reduce the structural integrity of the hinge, possibly to an unacceptable level. Also, the length of the links must be further increased with a corresponding decrease in efficiency if the boom pieces need to be spaced apart when stowed, i.e., if there is a significant offset between the hinge line and the boom and hinge center line. A need exists for a hinge actuator for a spacecraft boom that provides the necessary structural integrity and robustness but does not suffer the deficiencies of hinge actuators currently existing in the art.

BRIEF DESCRIPTION OF THE DRAWINGS

FIG. 2 is an illustration of a boom hinge including a flex-drive actuator according to an embodiment of the present invention;

DETAILED DESCRIPTION OF THE EMBODIMENTS

The following discussion of the embodiments of the invention directed to a flex-drive hinge actuator is merely exemplary in nature, and is in no way intended to limit the invention or its applications or uses. For example, the embodiments discussed below are described in the context of a boom hinge on a communications satellite. However, the disclosed semi-rigid chain may be used for actuation of any type of hinge, or for other applications where a circular arc deployment shape is needed.

Figure 1:
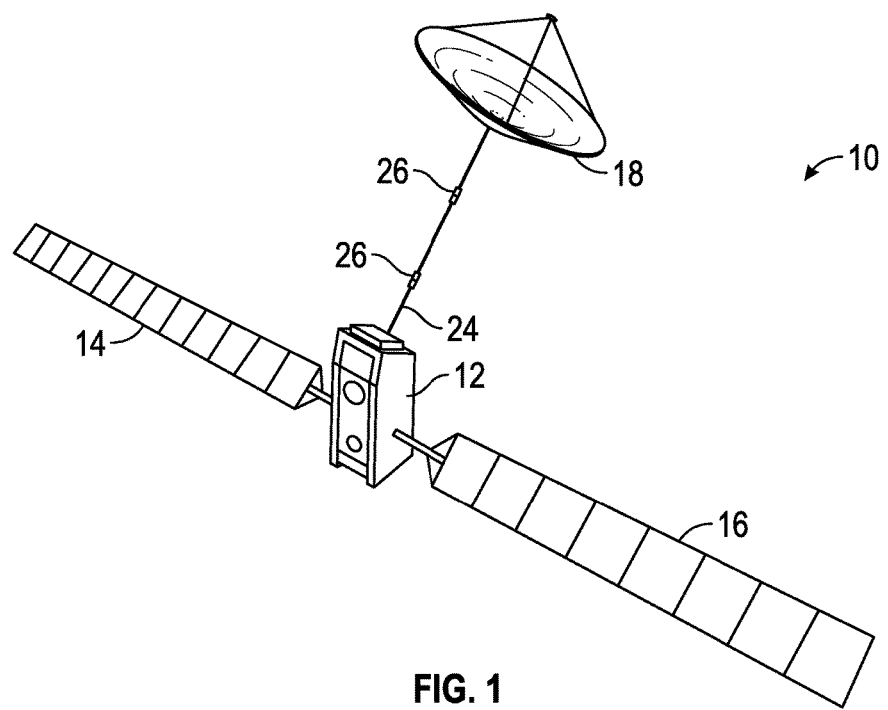
FIG. 1 is an illustration of a communications satellite including an antenna reflector deployed on a boom, where the boom includes at least one boom hinge.

FIG. 1 is an illustration of a communications satellite 10 including a satellite body 12 and solar arrays 14 and 16 mounted to the body 12 that have been extended or deployed. The satellite 10 further includes an antenna system having an antenna reflector 18 connected to the satellite body 12 by a boom 24. The antenna reflector 18 may be deployed on the boom 24 in order to position the reflector 18 away from thruster zones, to improve reflector lines of sight, or for other reasons. The operation of a communications satellite of this type is well understood in the art, and need not be discussed in detail here for a proper understanding of the invention.

When the satellite 10 is launched from earth, in a rocket fairing for example, the reflector 18 is folded or stowed into a launch envelope within a confined space. When the satellite 10 is on orbit, the reflector 18 is deployed on the boom 24 by the articulation of a plurality of boom hinges 26, where the number of hinges depends on the specific design. Particularly, the boom 24 typically includes two or more of the boom hinges 26 that provide the deployment, structural integrity, preloading and pointing stiffness necessary for the reflector 18. The reflector 18 is just one example of a payload that may be deployed on the end of the boom 24.

Hinge actuators have been developed in the past which employ a linkage-type mechanism and a drive motor to drive the hinges 26 from a stowed position to a deployed position of the boom 24. These linkage-type hinge actuators have had more parts and features added, in an attempt to overcome various performance and packaging problems. These added parts have increased the cost and complexity of traditional linkage-type hinge actuators, necessitating a clean-sheet design approach.

FIG. 2 is an illustration of a boom hinge 100 including a flex-drive actuator 110 according to an embodiment of the present invention. The hinge 100 is shown in an open position in FIG. 2, where the open position is 180° from a closed position of the hinge 100. In a common satellite/boom configuration, the open position of the hinge 100 corresponds to a stowed position of the boom, and the closed position of the hinge 100 corresponds to a deployed position of the boom. These relationships may be reversed without having any effect on the design of the flex-drive actuator. Also, the hinge actuation angle may be less than or greater than 180°. A boom section 114 is rigidly attached to a first hinge body 102, and a boom section 116 is rigidly attached to a second hinge body 104. With reference to FIG. 1, the reflector 18 could be mounted at a far end of the boom section 116, and the boom section 114 could be mounted to the satellite body 12 (or replaced by the satellite body 12). When the hinge 100 is in the open position of FIG. 2, the boom sections 114 and 116 are stowed parallel to each other. When the hinge 100 is in the closed position (shown later in FIG. 6), the boom sections 114 and 116 are deployed end-to-end such that the reflector 18 is extended away from the satellite body 12 on the boom 24. The boom sections 114 and 116 are not shown in FIGS. 4-6 in order to improve clarity of the flex-drive actuator components in those figures.

The flex-drive actuator 110 is a new way to actuate the hinge 100. Using a drive cog 120 and a unique drive chain 130, the hinge 100 can be remotely and reversibly driven between open and closed positions, thereby deploying or stowing the boom and attached payload. The chain 130 includes links 132 designed so that, when bent in one direction, the chain 130 pre-buckles into a rigid circular arc form that matches the deployment path of the hinge 100. This pre-buckling essentially converts the chain 130 into a rigid gear segment that can carry a moment to actuate the hinge 100. As the drive cog 120 retracts the drive chain 130 and the hinge 100 closes, the circular shape of the chain 130 then de-buckles on the free side of the cog 120, where the chain 130 can be stored as a straight section inside of a boom mounting tube or folded into a magazine. The flex-drive concept is scalable in that it can accommodate any desired actuation angle by addition of links to the chain 130. Details of the features described above will be shown in later figures and discussed below.

The first hinge body 102 includes a cog mounting cartridge 106 fixed thereto. The cog mounting cartridge 106 provides a pivotal mounting for the drive cog 120, where the pivot axis of the drive cog 120 is parallel to the pivot axis of the hinge 100 defined by a hinge pin 112. A motor 122 is mounted to either the first hinge body 102 or the cog mounting cartridge 106. The motor 122 drives rotation of the cog 120 as desired to open or close the hinge 100. The motor 122 may be any suitable type of motor—including but not limited to an electric motor of any type or architecture, a pneumatic motor, a spring motor, etc. The motor 122 may be aligned coaxially with the cog 120 and configured to directly drive the cog 120 on the motor's output shaft, or the motor 122 may be oriented perpendicular to the axis of the cog 120 and drive the cog 120 through a worm gear or other transmission mechanism.

The second hinge body 104 includes a terminal mounting bracket 108 fixed thereto. The terminal mounting bracket 108 provides an attachment point for a fixed end 134 of the drive chain 130. The fixed end 134 of the drive chain 130 may be fixedly mounted to the mounting bracket 108 such that the fixed end 134 is permanently oriented perpendicular to, or nearly perpendicular to, the face of the second hinge body 104. Alternately, the fixed end 134 of the drive chain 130 may be pivotably mounted to the mounting bracket 108 such that some pivoting of the fixed end 134 is possible, but the pivoting of the fixed end 134 is constrained within a narrow angular range near perpendicular. The constraint of the pivot angle of the fixed end 134 could be provided via interference with portions of the mounting bracket 108.

Figure 3A:
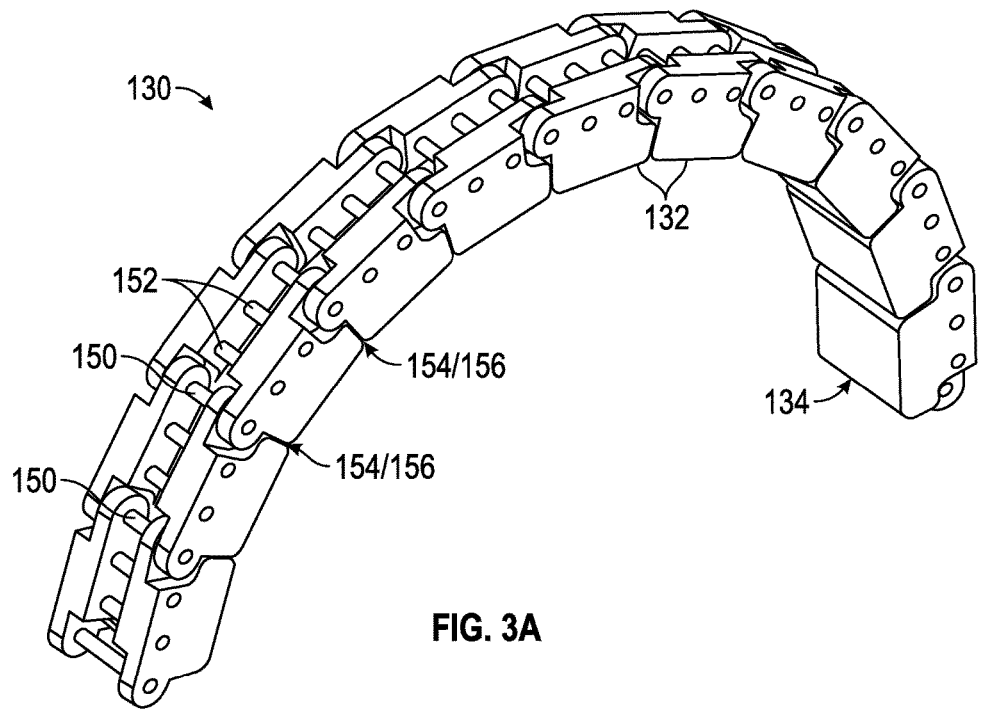
FIG. 3A is an illustration of the drive chain used in the flex-drive actuator of FIG. 2, where the drive chain uses links with four pins each.
Figure 3B:
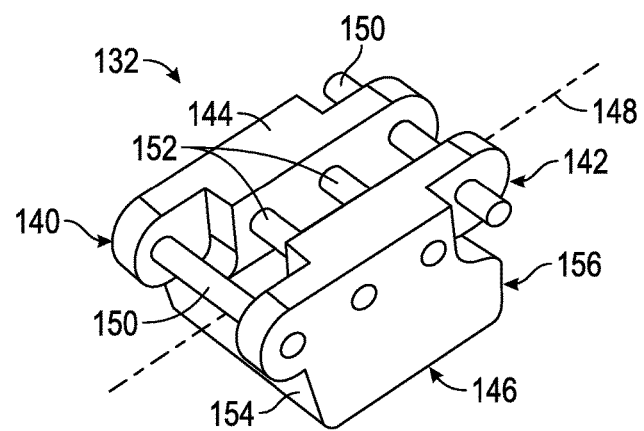
FIG. 3B is an illustration of one of the links of the chain of FIG. 3A.

FIG. 3A is an illustration of the drive chain 130 used in the flex-drive actuator of FIG. 2, while FIG. 3B is an illustration of one of the links 132 of the chain 130. In the preferred embodiment of the chain 130, all of the links 132 are the same; that is, there is only one type of the link 132. In another chain design, there are two types of links and every other link is a different type; that is, there is a "Type A" link and a "Type B" link, and the chain is comprised of an alternating series of links, A-B-A-B-A etc.

The links 132 of the drive chain 130 are pivotably attached to each other in a manner similar to a bicycle chain, such that the chain 130 can bend only in a flexibility plane which is perpendicular to the pivot pin axes. The links 132 are also designed with specific geometric features which allow the chain 130 to bend freely in one direction in the flexibility plane (referred to herein as the free direction) while causing the chain 130 to buckle into a rigid circular arc when bent in the other direction in the flexibility plane (referred to herein as the constrained direction). The chain 130 as shown in FIG. 3A is bent in the constrained direction and buckled into the rigid circular arc shape.

Each of the links 132 includes a first end 140, a second end 142, a top 144 and a bottom 146, while the links 132 are preferably symmetrical in a side-to-side direction. The terms "top" and "bottom" are used here solely for convenience in describing geometric features of the links 132, and do not imply any absolute orientation of the links 132 or the chain 130 relative to a satellite, or the planet earth, or any other entity. The top 144 is the portion of the link 132 which is located at an outer radius of the chain 130 from the hinge pin 112. The bottom 146 is the portion of the link 132 which is located at an inner radius of the chain 130 from the hinge pin 112. Each of the links 132 can be also considered to have a centerline 148, where the centerline 148 runs from the first end 140 to the second end 142 of the link 132, and passing through a three-dimensional geometric center of the link 132.

Each of the links 132 includes two pivot pins 150, with one of the pivot pins 150 being located near the first end 140 and one of the pivot pins 150 being located near the second end 142 of the link 132. The pivot pins 150 connect two consecutive links 132 in the chain 130, and allow pivotal motion between the links 132 in the flexibility plane. The pivot pins 150 are perpendicular to, but do not intersect with, the centerline 148. Rather, the pivot pins 150 are offset toward the top 144 of the links 132. Each of the links 132 also includes two drive pins 152. The drive pins 152 are oriented parallel to the pivot pins 150, and are located between the pivot pins 150. The drive pins 152 are used solely to drive the chain 130 by the cog 120. The links 132 of the drive chain 130 each include four pins (two of the pivot pins 150 and two of the drive pins 152), but other link designs are possible and are discussed below. In any chain design embodiment, the spacing between consecutive pins (whether a pivot pin 150 or a drive pin 152) in the links 132 of the chain 130 is constant, and is designed to match the tooth pitch of the cog 120.

Each of the links 132 further includes abutment surfaces 154 and 156 at the first end 140 and the second end 142, respectively. The abutment surfaces 154/156 are offset from the centerline 148 toward the bottom 146 of the links 132. The abutment surfaces 154/156 provide points of contact or physical interference between the bodies of consecutive links 132, thus limiting the degree of free bending of the chain 132 in the constrained direction. By placing the pivot pins 150 along the top 144, and the abutment surfaces 154/156 along the bottom 146 of the links 132, the chain 130 is naturally predisposed to lock into a rigid circular arc shape. The placement of the pivot pins 150 and the abutment surfaces 154/156 is designed so that the radius of the circular arc shape of the chain 130 matches the radius at which the chain 130 is placed from the hinge pin 112. In a preferred embodiment, the top-to-bottom distance between the pivot pins 150 and the abutment surfaces 154/156 is maximized, in order to maximize the moment-carrying capability of the chain 130 while minimizing shear loads in the pivot pins 150 and compressive loads at the abutment surfaces 154/156.

In FIG. 3A, the chain 130 is shown in the constrained or buckled position, where it is essentially a rigid arc. It can be seen that the chain 130 cannot bend into a tighter radius in the constrained direction because of the connection at the pivot pins 150 and the interference at the abutment surfaces 154/156. The exact contours of the abutment surfaces 154/156, and their positions relative to the pivot pins 150, are designed to cause the chain 130—when in the constrained or buckled position—to describe a circular arc shape with a specific desired radius. The radius of the chain 130 when buckled as in FIG. 3A is designed to match the radius of the chain 130 from the pivot pin 112 in the boom hinge 100. As a result, the chain 130 acts as a rigid gear sector to drive the hinge 100 open or closed.

From the geometry of the pivot pins 150 and the abutment surfaces 154/156, it can also be seen that, if the chain 130 was to be bent in the opposite direction (the "free" direction—concave upward in FIG. 3A), each pair of adjacent links 132 could pivot at least 90°. Thus, when bent in the free direction (so that the abutment surfaces 154/156 do not make contact), the chain 130 could be folded back on itself or rolled into a fairly tight scroll. The fact that the drive chain 130 locks into a circular shape in one bending direction and bends freely in the other direction makes the chain 130 ideal for a packaging-constrained hinge actuation application.

Figure 4:
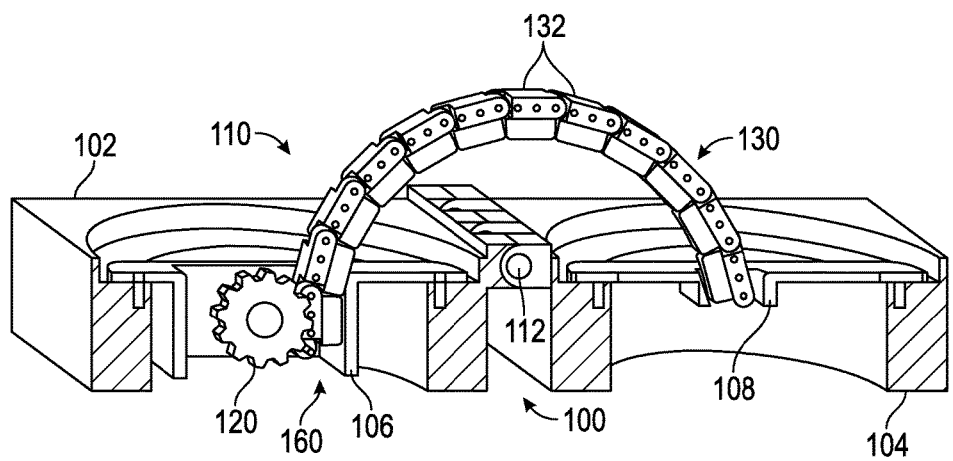
FIG. 4 is a partially cut-away illustration of the boom hinge including the flex-drive actuator as in FIG. 2.

FIG. 4 is a partially cut-away illustration of the boom hinge 100 including the flex-drive actuator 110 as in FIG. 2. A channel 160 formed between the cog mounting cartridge 106 and the drive cog 120 guides the chain 130 into proper engagement with the drive cog 120. Although the links 132 are also shown cut-away with no pins in FIG. 4, it can be seen how the drive cog 120 engages with both the pivot pins 150 and the drive pins 152 in the links 132 of the chain 130. Furthermore, it is noted that the cog 120 is preferably located radially outboard of the chain 130, relative to the hinge pin 112, in order to facilitate engagement of the cog 120 with the pivot pins 150 and the drive pins 152 which are necessarily located on the top 144 or radially outer part of the links 132. The portion of the chain 130 which engages with the cog 120 is essentially perpendicular to the first hinge body 102, as the chain 130 is guided by the channel 160 of the cog mounting cartridge 106. It is also clear in FIG. 4 that the chain 130 describes a circular arc which is concentric with the hinge pin 112 of the hinge 100.

Figure 5:
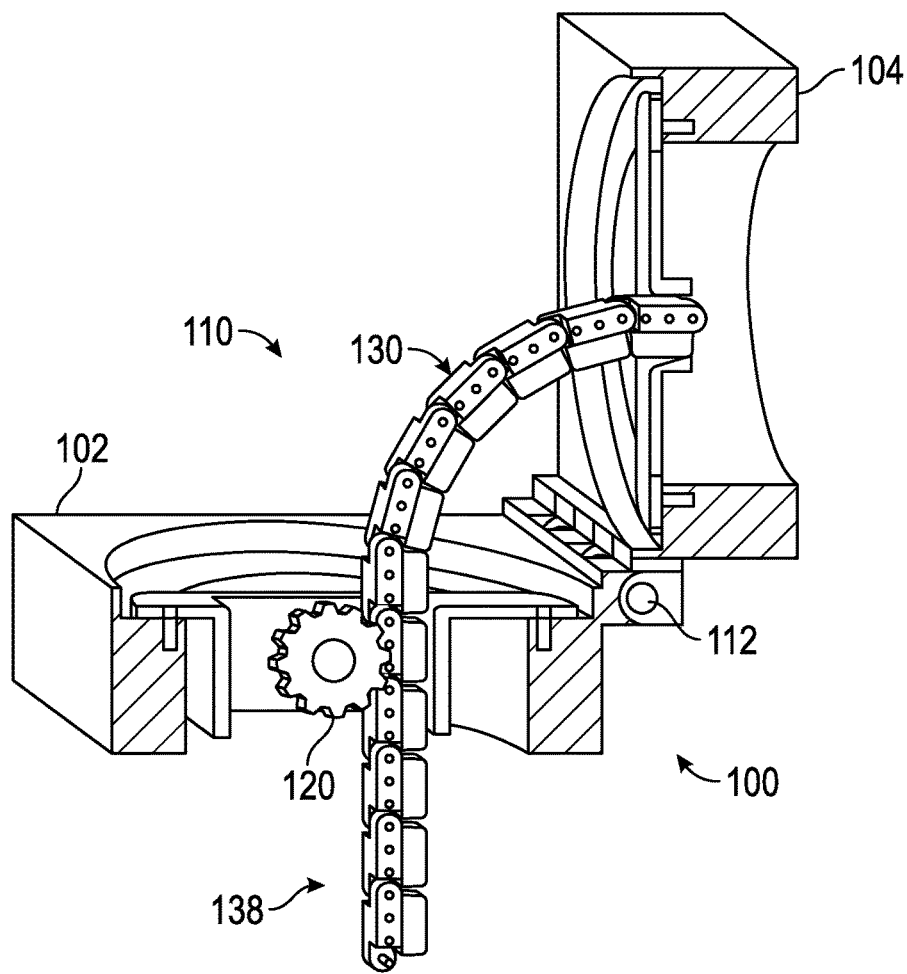
FIG. 5 is a partially cut-away illustration of the boom hinge and the flex-drive actuator, where the hinge has been closed about halfway from the fully open position of FIG. 4.

FIG. 5 is a partially cut-away illustration of the boom hinge 100 and the flex-drive actuator 110, where the hinge 100 has been closed about halfway from the fully open position of FIG. 4. In FIG. 5, the drive chain 130 still describes a circular arc concentric with the hinge pin 112, but the arc segment is only about 90° instead of 180°. Furthermore, there is now a slack portion 138 of the chain 130 below the cog 120. Again, the term "below" is relative to the orientation of FIG. 5. The key point is that the slack portion 138 is not constrained between the hinge bodies 102 and 104, but rather is free beyond its engagement with the cog 120. The slack portion 138 of the chain 130 could be allowed to extend in a generally straight form behind the first hinge body 102—into a boom tube, for example. The slack portion 138 of the chain 130 could also be rolled up into a fairly tight scroll inside a storage magazine. The slack portion 138 can be handled as best suits the specific application.

Figure 6:
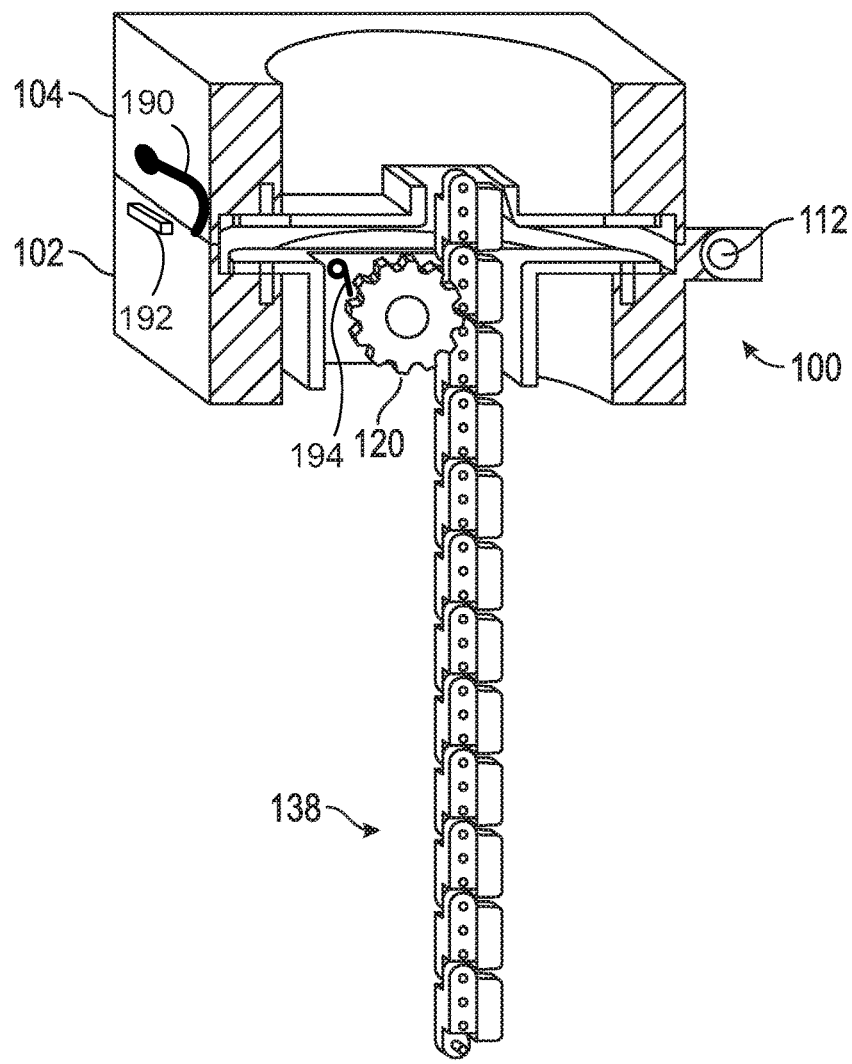
FIG. 6 is a partially cut-away illustration of the boom hinge and the flex-drive actuator, where the hinge has been fully closed.

FIG. 6 is a partially cut-away illustration of the boom hinge 100 and the flex-drive actuator 110, where the hinge 100 has been fully closed. When the hinge 100 is fully closed as in FIG. 6, the portion of the drive chain 130 between the hinge bodies 102 and 104 becomes a very short, straight segment. At the same time, the slack portion 138 comprises the majority of the links 132 of the chain 130.

It is important to recognize that the operation of the flex-drive actuator 110 is inherently stable in both the hinge opening and closing directions. Starting with the hinge 100 open (FIG. 4), the chain 130 is locked into its circular arc shape, concentric with the hinge pin 112, and naturally follows the path of the second hinge body 104 as the cog 120 pulls the chain 130 and the hinge 100 closes. If it becomes necessary to re-open the hinge 100, the cog 120 rotates in the opposite direction and pushes the chain 130 (upward in FIG. 6). Because of the rotation of the second hinge body 104 about the hinge pin 112, the fixed end 134 of the chain 130 is immediately caused to bend in the constrained direction, where it locks or buckles into its circular arc shape and matches the motion of the second hinge body 104. The simplicity and inherent robustness of the flex-drive actuator 110 make it ideal for satellite boom hinge actuation.

In satellite deployable boom payload applications, it is often necessary for the boom to be rigid when deployed. This means that the boom hinge 100 must be closed tightly. In some legacy types of hinge actuators, a separate latching mechanism is added to securely latch the hinge 100 in a closed position. Such an external latch, represented by a latch hook 190 on the second hinge body 104 and a flange 192 on the first hinge body 102, could be added to the flex-drive actuator 110. Other types of external latch mechanisms could also be employed. As another option, the drive cog 120 could be used to maintain a latching preload on the chain 130, where the latching preload could be applied by the motor 122 or by another mechanism, such as a lever 194, which holds the cog 120 in a position where it applies residual tension in the chain 130 after the hinge 100 is fully closed.

Figure 7:
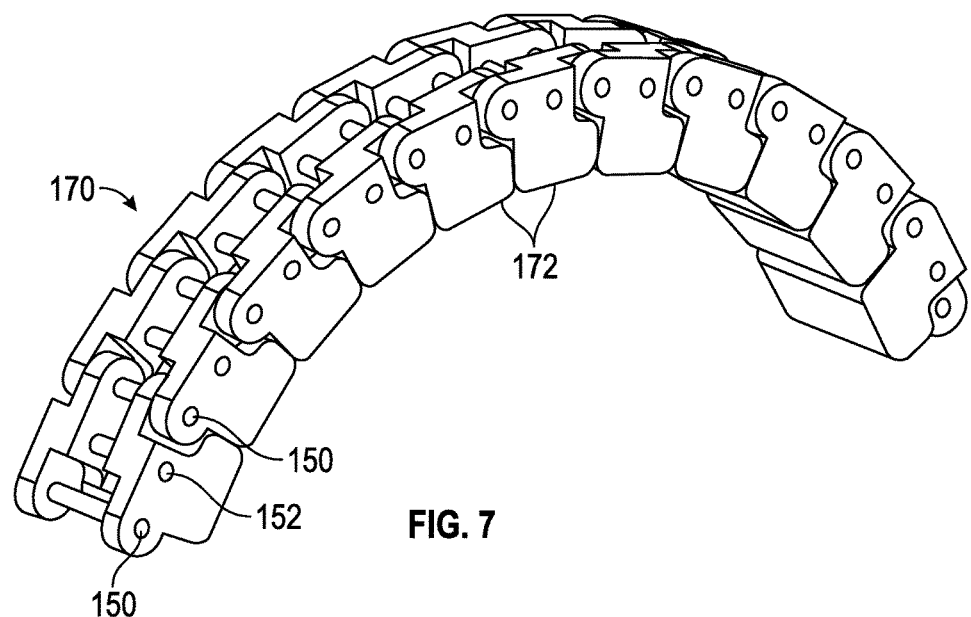
FIG. 7 is an illustration of a second embodiment of a drive chain, where the drive chain uses links with three pins each.

FIG. 7 is an illustration of a second embodiment of a drive chain 170, where the drive chain 170 uses links 172 with three pins each. The general shape and function of the links 172 is the same as for the links 132 discussed above, but the links 172 have only three pins each (two of the pivot pins 150 and one of the drive pins 152) instead of four.

Figure 8:
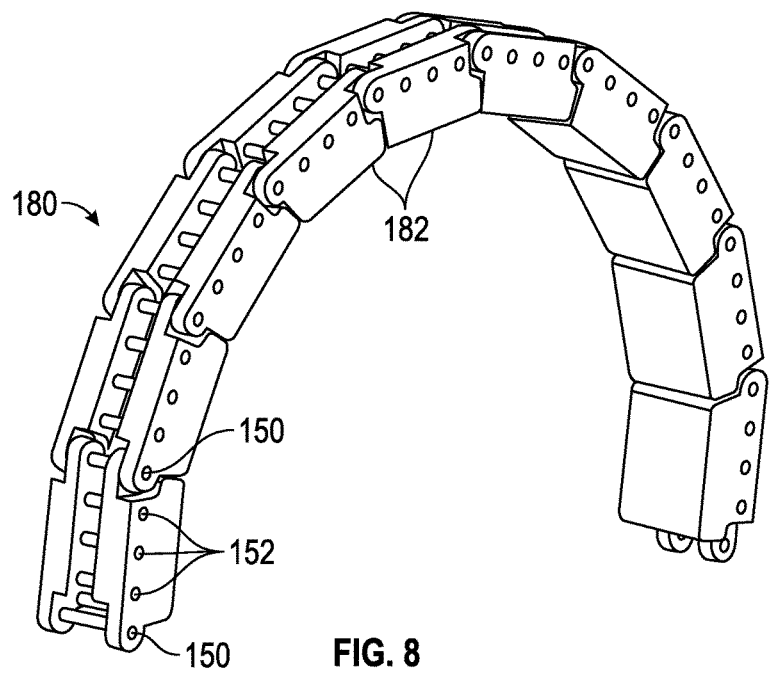
FIG. 8 is an illustration of a third embodiment of a drive chain, where the drive chain uses links with five pins each.

FIG. 8 is an illustration of a third embodiment of a drive chain 180, where the drive chain 180 uses links 182 with five pins each. The general shape and function of the links 182 is the same as for the links 132 and 172 discussed above, but the links 182 have five pins each (two of the pivot pins 150 and three of the drive pins 152) instead of four or three.

The drive chains 130, 170 and 180 all operate on the same principle—where they lock into a circular arc shape as a result of the pivot pin and abutment surface interaction. One of the three-, four- or five-pin designs of the chains 170, 130 and 180 may be used as best suits a particular application, depending on the size of the hinge 100 and the desired chain radius. Other chain designs may also be advantageous—including a design with only two pins (two of the pivot pins 150), and designs with more than five pins.

The flex-drive actuator for boom hinges described above offers a dramatic simplification compared to traditional mechanism-type boom hinge actuators. The unique combination of features of the flex-drive actuator enables communication satellites with deployable booms to be made lighter, less expensive, less complex and more reliable—all of which are favorable for telecommunications and other companies which employ communications satellites, and ultimately for the consumer.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A hinge and actuator assembly, said hinge including a first hinge body and a second hinge body connected by a hinge pin, wherein the hinge connects a satellite boom section to a satellite body or another boom section, said assembly comprising:
   a cog mounting cartridge fixed to the first hinge body;
   a drive motor mounted to the cog mounting cartridge or to the first hinge body;
   a drive cog pivotably mounted to the cog mounting cartridge and coupled to an output shaft of the drive motor, where a pivot axis of the drive cog is parallel to a pivot axis of the hinge pin, and where rotation of the output shaft of the drive motor causes rotation of the drive cog;
   a terminal mounting bracket fixed to the second hinge body; and
   a drive chain comprising:
   a plurality of links; and
   a plurality of pivot pins having a pivot axis which is parallel to the pivot axis of the hinge pin;
   wherein each pair of adjacent links are connected by a pivot pin,
   and the links also include an abutment surface at each end where adjacent links make compressive contact;
   wherein a link at a first end of the drive chain is pivotably attached to the terminal mounting bracket on the second hinge body, a second end of the drive chain is not attached to anything, and the drive chain passes through a channel in the cog mounting cartridge where the drive cog engages with the pivot pins on the links of the drive chain, and a rotation of the drive cog translates the drive chain and causes the hinge to open or close, and
   wherein the pivot pins and the abutment surfaces are positioned on each of the links to cause the drive chain to prebuckle into a rigid circular arc shape, outside the channel and extending between the first hinge body and the second hinge body, which matches a motion of the second hinge body relative to the first hinge body.

2. The assembly of claim 1 further comprising:
   one or more drive pins in each of the links of the drive chain, where the pivot pins are located near each end of each link and the drive pins are located between the pivot pins,
   where the drive cog engages with the pivot pins and with the drive pins to move the chain.

3. The assembly of claim 2 wherein each of the links of the drive chain includes two of the pivot pins and three or fewer of the drive pins.

4. The assembly of claim 3 wherein the pivot pins and the drive pins are equally spaced along a length of the links.

5. The assembly of claim 1 wherein the channel in the cog mounting cartridge is configured to guide the drive chain into engagement with the drove cog in an orientation which is substantially perpendicular to the first hinge body, and the channel further supports the drive chain laterally and radially relative to the drive cog.

6. The assembly of claim 1 wherein the links are configured with the pivot pins at a location which is further from the hinge pin than the abutment surfaces are from the hinge pin.

7. The assembly of claim 1 wherein the hinge actuator is configured such that the drive chain is positioned between the drive cog and the hinge pin.

8. The assembly of claim 1 further comprising:
   a latching device which latches an edge of the first hinge body to an adjacent edge of the second hinge body to secure the hinge in a closed position.

9. The assembly, of claim 1 further comprising:
   a latching device which applies a force or torque to the drive cog which creates residual tension in the drive chain when the hinge is in the closed position.

10. A self-actuated satellite boom hinge, said boom hinge comprising:
    a satellite body;
    a deployable boom having at least one section;
    a first hinge body fixed to a first section of the deployable boom;
    a second hinge body connected to the first hinge body by a hinge pin, said second hinge body being fixed to the satellite body or to a second section of the deployable boom;
    a cog mounting cartridge fixed to the first hinge body;
    a drive motor mounted to the cog mounting cartridge or to the first hinge body;
    a drive cog pivotably mounted to the cog mounting cartridge and coupled to an output shaft of the drive motor, where a pivot axis of the drive cog is parallel to a pivot axis of the hinge pin, and where rotation of the output shaft of the drive motor causes rotation of the drive cog;
    a terminal mounting bracket fixed to the second hinge body; and
    a drive chain comprising:
    a plurality of links; and
    a plurality of pivot pins having a pivot axis which is parallel to the pivot axis of the hinge pin;
    wherein each pair of adjacent links are connected by a pivot pin,
    and the links also include an abutment surface at each end where adjacent links make compressive contact;
    wherein a link at a first end of the drive chain is pivotably attached to the terminal mounting bracket on the second hinge body, a second end of the drive chain is not attached to anything, and the drive chain passes through a channel in the cog mounting cartridge where the drive cog engages with the pivot pins on the links of the drive chain, and a rotation of the drive cog translates the drive chain and causes the boom hinge to open or close,
    and wherein the pivot pins and the abutment surfaces are positioned on each of the links to cause the drive chain to prebuckle into a rigid circular arc shape outside the channel which follows a motion of the second hinge body relative to the first hinge body.

11. The boom hinge of claim 10 wherein the deployable boom and an attached payload are deployed when the boom hinge closes, and the deployable boom and the attached payload are stowed when the boom hinge opens.

12. The boom hinge of claim 10 further comprising:
a latching device which latches an edge of the first hinge body to an adjacent edge of the second hinge body to secure the boom hinge in a closed position.

13. The boom hinge of claim 10 further comprising:
a latching device which applies a force or torque to the drive cog which creates residual tension in the drive chain when the boom hinge is in the closed position.

14. The boom hinge of claim 10 further comprising:
one or more drive pins in each of the links of the drive chain, where the pivot pins are located near each end of each link and the drive pins are located between the pivot pins,
where the drive cog engages with the pivot pins and with the drive pins to move the chain, and
where the pivot pins and the drive pins are equally spaced along a length of the links.

15. The boom hinge of claim 10 wherein the channel in the cog mounting cartridge is configured to guide the drive chain into engagement with the drove cog in an orientation which is substantially perpendicular to the first hinge body, and the channel further supports the drive chain laterally and radially relative to the drive cog.

16. The boom hinge of claim 10 wherein the links are configured with the pivot pins at a location which is further from the hinge pin than the abutment surfaces are from the hinge pin, and the boom hinge is configured such that the drive chain is positioned between the drive cog and the hinge pin.

17. A flex-drive satellite boom hinge actuator comprising:
a hinge including two halves connected by a hinge pin, where the hinge couples sections of a deployable satellite boom;
a drive cog driven by a motor; and
a drive chain,
wherein the drive chain pre-buckles into a rigid circular arc shape that matches a relative path of the two halves of the hinge,
wherein the drive chain includes:
a plurality of links; and
a plurality of pivot pins which are offset from a centerline of each of the links,
wherein each pair of adjacent links are connected by a pivot pin;
wherein the links also each include an abutment surface at each end configured to make compressive contact with the abutment surface of an adjacent link, and
the pivot pins and the abutment surfaces are positioned on each of the links to cause the drive chain to form the circular arc shape when driven by the drive cog.

18. The flex-drive hinge actuator of claim 17 wherein the links are configured with the pivot pins at a location which is further from a hinge pin of the hinge than the abutment surfaces are from the hinge pin.

19. The flex-drive hinge actuator of claim 18 wherein the hinge actuator is configured such that the drive chain is positioned between the drive cog and the hinge pin.

* * * * *